United States Patent [19]

Ito et al.

[11] Patent Number: 4,927,246
[45] Date of Patent: May 22, 1990

[54] PLANAR ELECTROCHROMIC DIMMER

[75] Inventors: Toshiyasu Ito; Jun Minoura; Shigeyuki Takahashi; Takaaki Mori; Mamoru Kato; Toshikazu Funahashi, all of Aichi, Japan

[73] Assignee: Toyoda Gosei Co., Ltd., Nishikasugai, Japan

[21] Appl. No.: 231,470

[22] Filed: Aug. 12, 1988

[30] Foreign Application Priority Data

Aug. 13, 1987 [JP] Japan ............................ 62-124153[U]

[51] Int. Cl.$^5$ .................................................. G02F 1/17
[52] U.S. Cl. ...................................... 350/357; 350/1.7
[58] Field of Search ................... 350/357, 1.7; 340/785

[56] References Cited

U.S. PATENT DOCUMENTS

| | | | |
|---|---|---|---|
| 3,781,077 | 12/1973 | Groth | 350/1.7 |
| 4,168,610 | 9/1979 | Engquist | 60/323 X |
| 4,337,990 | 7/1982 | Fan et al. | 350/1.7 |
| 4,338,000 | 7/1982 | Kamimari et al. | 350/357 |
| 4,664,934 | 5/1987 | Ito et al. | 427/38 |
| 4,714,308 | 12/1987 | Sawamura et al. | 350/1.7 |
| 4,726,680 | 2/1988 | Allington | 356/319 |
| 4,750,816 | 6/1988 | Ito et al. | 350/357 |

FOREIGN PATENT DOCUMENTS 2034348 1/1971 Fed. Rep. of Germany ....... 350/1.7

Primary Examiner—Eugene R. LaRoche
Assistant Examiner—Nathan W. McCutcheon
Attorney, Agent, or Firm—Cushman, Darby & Cushman

[57] ABSTRACT

The present invention relates to a planar electrochromic dimmer used in dimming devices such as car sun roofs, and others having a structure comprising; a pair of bases, each comprising a transparent electrode film provided on each of a pair of bases, and arranged such that both transparent electrode films are facing each other, an electrolyte provided between the two electrode-equipped bases, a color-forming layer provided on at least one of the electrode-equipped bases, and a thin film with a visible ray transmittivity of 20–60% provided on at least one of the bases or the transaprent electrode films.

7 Claims, 1 Drawing Sheet

PLANAR ELECTROCHROMIC DIMMER

BACKGROUND OF THE INVENTION

1. Field of the Invention

The present invention relates to planar electrochromic dimmers used in dimming devices such as sun roofs for cars, and others.

2. Description of the Related Art

In sun roofs for cars, in order to set the visible ray transmittivity to about 30%, a method where a butyral film used in the plate glass itself and in the laminated glass is colored, and a method which involves mesh printing are being used. Also, glass dimmers that make use of electrochromic elements to change the coloring conditions are also being proposed.

In the methods mentioned above, in which the visible ray transmittivity is decreased by means of the usual coloring effect of electrochromic elements, the electrochromic element generates heat due to the absorption of the rays, resulting in the deterioration of its thermal insulating effect.

The visible ray transmittivity of ordinary electrochromic elements is about 60% in the discoloring conditions and about 10% in the coloring conditions. However, the 10% visible ray transmittivity is not enough in insulate light. Also, it is possible to get lower transmittivity by impressing high voltage upon the electrochromic elements, but such electrochromic elements deteriorate quickly and have a problem with endurance. When the glass dimmers are used to insulate light for sun roofs for cars, desirable change of the transmittivity of the electrochromic elements is about from 30% to 5%. However, when the adjustment is done by the electrochromic elements only, it is necessary to control electrochromic elements in the constant coloring conditions. Especially, in the case of adjusting the visible ray transmittivity at 5%, the electrochromic elements are loaded and cause problem in endurance.

SUMMARY OF THE INVENTION

An object of the present invention is to provide a planar electrochromic dimmer in which the visible ray transmittivity is effectively controlled, and in which the thermal insulating property is maintained.

Another object of the present invention is to provide a planar electrochromic dimmer which is durable, stable, and has good coloring and discoloring response.

In order to achieve the objects mentioned above, the present invention employs a structure comprising a pair of electrode-equipped bases comprising a pair of bases and a pair of transparent electrode films disposed on each of these bases, the electrode-equipped bases being arranged such that the transparent electrode films are facing each other; an electrolyte disposed between the electrode-equipped bases; a color-forming layer disposed on at least one of the electrode-equipped bases; and a thin film having a visible ray transmittivity of 20–60%, disposed on at least one of the bases or on at least one of the transparent electrode films.

Other objects of the present invention will become apparent with an understanding of the embodiments described later, and as clarified in the appended claims. Further, many advantages not mentioned in this specification will become obvious to one skilled in the art upon application of the present invention.

DETAILED DESCRIPTION OF THE PREFERRED EMBODIMENTS

First Embodiment

An embodiment which is a concretization of the present invention is described below with reference to FIG. 1.

Figure 1:
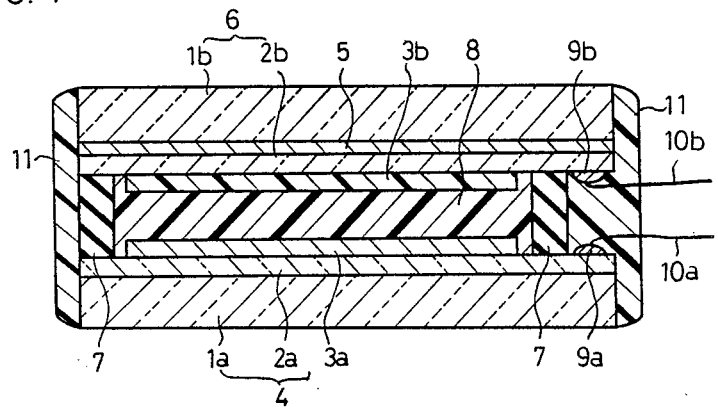
FIG. 1 is a sectional view showing the planar electrochromic dimmer of the first embodiment of the present invention.

As shown in FIG. 1, the lower electrode-equipped base 4 comprises a transparent base 1a made of transparent glass 400 mm square and 2.5 mm thick, and a transparent electrode film 2a made of ITO (indium trioxide ($In_2O_3$) containing 5% by weight tin dioxide ($SnO_2$)), formed on the upper surface of the transparent base 1a. An oxidative color-forming layer 3a made of polyaniline is disposed on the upper surface of the transparent electrode film 2a. The oxidative color-forming layer 3a is formed to a thickness of about 6000 Å by electropolymerization. Polypyrrole, polythiophene, and others can also be used as materials for the oxidative color-forming layer 3a.

Aside from transparent glass, transparent resins such as polycarbonate, polymethyl metacrylate, polyether sulfon, polyetherketone, and others can also be used for the transparent base 1a mentioned above. Also, aside from ITO, $SnO_2$ can also be used as the material for the transparent electrode film 2a. Further, the transparent electrode film 2a is formed on the transparent base 1a by the sputtering method, using the ITO. The transparent base is cleaned by ultrasonic cleaning. The transparent electrode film 2a has a thickness of about 2000 Å, and electrical resistance of 10Ω/□. Aside from the sputtering method, other methods such as ion plating, chemical vapor deposition (MOCVD) using organic metals, and others are also employed as methods of forming the ITO film.

On the other hand, in the same manner, the upper electrode-equipped base 6 comprises a transparent base 1b and a metal film 5 as the thin film, made of Hastelloy X which is an alloy of Ni-Cr formed on the lower surface of the transparent base 1b, acting as a film to regulate the visible ray transmittivity. A transparent electrode film 2b made of ITO is disposed on the lower surface of the metal film 5. Further, a reductive color-forming layer 3b made of tungstic trioxide ($WO_3$) is disposed on the lower surface of this metal film 5.

From here, the metal film 5 mentioned above is described.

In the present embodiment, a 75 Å thick film was formed by the sputtering method on the lower surface of the transparent base 1b using Hastelloy X, an alloy of nickel-chromium (Ni-Cr), as metal. The visible ray transmittivity with respect to the metal film 5 was 40%. Hastelloy X contains 47.3% Ni, 21.8% Cr, 18.5% Fe, 9.0% Mo, 1.5% Co, and other metals. Since Hastelloy X reflects visible rays and infrared rays in a wide range of wavelengths, and is highly corrosion resistant, it is ideal for use as a metal film 5. By forming to a thickness of 40–120 Å, the visible ray transmittivity can be regulated to within the range of 20–60%. Since visible rays and infrared rays are sufficiently reflected within this range of light transmittivity, a reasonable degree of thermal insulation is obtained.

When the visible ray transmittivity of the metal 5 is less than 20%, it becomes too dark during discoloring; when it exceeds 60%, it becomes too bright during coloring. The visible ray transmittivity of the planar electrochromic dimmer of the present embodiment can be effectively kept equal to or less than 50%. Further, the visible ray reflectivity is about 20–40%.

Aside from Hastelloy X, the metals used for the metal film 5 are silver (Ag), nickel (Ni), gold (Au), platinum (Pt), and others. Also, aside from the sputtering method, vacuum deposition method, or others can also be employed in forming the metal film. When using Ag in forming the metal film 5 by the sputtering method, the corresponding thickness of the film that yields a visible ray transmittivity of 20–60% is about 130–270 Å.

Further, aside from the metal film 5 mentioned above, an ultraviolet ray reflecting film or an infrared ray reflecting film is used for the thin film that regulates the visible ray transmittivity. Zinc oxide (ZnO), cerium oxide ($CeO_2$), neodymium oxide ($Nd_2O_3$), or others are used as an ultraviolet ray reflecting film.

Also, visible rays and ultraviolet rays can be more effectively reflected by simultaneously vaporizing on the base, ZnO, or others used as the ultraviolet ray reflecting film mentioned above, and the Ni, Cr, Ni-Cr alloys, or others used as the metal film. The ideal thickness of the ultraviolet ray reflecting film is 200 Å or greater. When the thickness of this film is less than 200 Å, it becomes difficult to regulate the visible ray transmittivity to 60% or lower. The visible ray transmittivity is regulated within the range of 20–60%, according to the thickness of the ultraviolet ray reflecting film. Consequently, in addition to visible rays, ultraviolet rays are also effectively reflected. Thus, the planar electrochromic dimmer can be easily maintained, and its deterioration can be prevented.

A three-layer film of titanium oxide ($TiO_2$)/silver (Ag)/$TiO_2$, a three-layer film of zinc sulfide (ZnS)/Ag/Zns, or others are used as an infrared reflecting film. The appropriate thicknesses of these layers are about 300–350 Å/150 Å/300–350 Å respectively. The visible ray transmittivity can be regulated by changing the thickness of the Ag layer. When the thickness of the Ag layer is less than 100 Å, the visible ray transmittivity does not become 60% or less. The visible ray transmittivity is set within the range of 20–60% according to the thickness of the same infrared reflecting film. In this case, in addition to visible rays, infrared rays are also effectively reflected. Since these infrared reflecting films also reflect ultraviolet rays to a certain level, they are also effective in preventing deterioration.

Aside from the three-layer films used as infrared reflecting films, a two-layer film of $TiO_2$/Ag or ZnS/Ag with thicknesses 300–350 Å/150 Å can also be used.

Next, the reductive color-forming layer 3b is formed to a thickness of about 6000 Å by vacuum deposition method using a $WO_3$ tablet.

The lower electrode-equipped base 4 and the upper electrode-equipped base 6 are arranged such that the transparent electrode film 2a and the transparent electrode film 2b are facing each other, with the space formed by the two electrode-equipped bases 4, 6 mentioned above and the spacers 7 being filled with an electrolyte 8 containing ultraviolet-curing resin.

The electrolyte 8 mentioned above is obtained, firstly, by preparing a liquid mixture at 1:3 ratio of ultraviolet-curing resin and an organic electrolyte consisting of 1 mole concentration of lithium perchlorate or lithium tetrafluoroborate dissolved in propylene carbonate. The space enclosed by the lower electrode-equipped base 4, the upper electrode-equipped base 6, and the spacers 7 is filled with the electrolytic mixture, and the electrolyte 8 is obtained by making this electrolytic mixture harden through exposure to ultraviolet rays from a high voltage mercury lamp (80 W/cm). In this case, ultraviolet-curing acrylic resins such as denatured polyester acrylic resin, denatured epoxy acrylic resin, and others are used as ultraviolet-curing resins.

A conductive paste is applied on one end of the transparent electrode film 2a on the lower electrode-equipped base 4, to act as an electrode connector portion 9a. A lead wire 10a extends from the same electrode connector portion 9a.

In the same manner, an electrode connector portion 9b is provided by applying a conductive paste on one end of the lower surface of the transparent electrode film 2b on the upper electrode-equipped base 6. Also, a lead wire 10b extends from the same electrode connector portion 9b.

Sealing portions 11 are provided at the end surfaces of the lower electrode-equipped base 4 and the upper electrode-equipped base 6, using as a sealing material an epoxy resin that hardens at normal temperature. Heat-curing epoxy resin, hot-melt butyl rubber, polysulfide rubber, silicon rubber, and others can also be used as sealing materials.

The operation of the planar electrochromic dimmer constructed as above is described, and its effects are mentioned.

First, when a voltage of +1.4 V is applied between the lead wires 10a, 10b, the same voltage becomes applied to the transparent electrode film 2a by means of the electrode connector portion 9a, and an oxidative reaction occurs involving the polyaniline in the oxidative color-forming layer 3a. At the same time, as a result of the action of the electrolyte 8, a reductive reaction occurs involving the $WO_3$ in the reductive color-forming layer 3b. Thus, the planar electrochromic dimmer rapidly changes from its colorless state to a bluish color, starting from its perimeter, then toward the center. Next, in a similar manner, when a voltage of −2.1 V is applied between the lead wires 10a, 10b, the same voltage becomes applied to the transparent electrode film 2a, the reverse of the reactions mentioned above occurs in the oxidative color-forming layer 3a and in the reductive color-forming layer 3b, and the planar electrochromic dimmer discolors.

During the discoloring of the planar electrochromic dimmer, the visible ray transmittivity is effectively kept at or lower than 50% due to the metal film 5. In this case, since the same metal film 5 reflects visible rays, infrared rays, and ultraviolet rays, the thermal insulation of the planar electrochromic dimmer of the present embodiment is high. Further, when the metal film 5 on the lower surface of the transparent base 1b is made of a conductive material, the current needed for coloring and discoloring flows into both the transparent electrode film 2b and the metal film 5. Thus, since the conductivity of the upper electrode-equipped base 6 becomes greater, the planar electrochromic dimmer has good coloring and discoloring response, and is stable. Also, consequently, the ITO film as a transparent electrode film 2b and the $WO_3$ as a reductive color-forming layer 3b or the polyaniline film as an oxidative color-forming layer 3a do not easily peel off, and since Hastelloy X has high corrosion resistance, the durability of the planar electrochromic dimmer is greatly improved.

Second Embodiment

Another embodiment of the present invention is described below with reference to FIG. 2.

Figure 2:
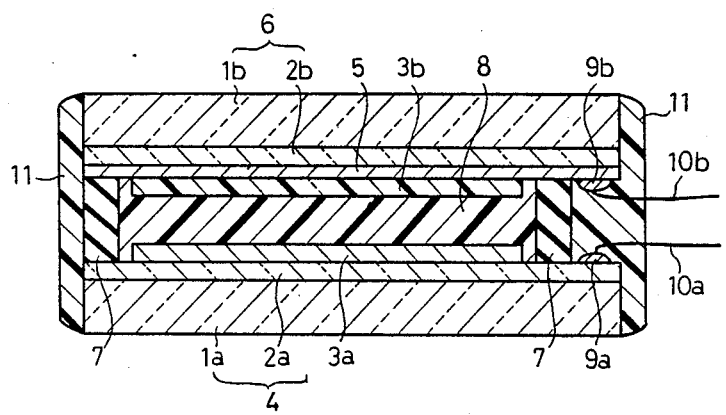
FIG. 2 is a sectional view showing the planar electrochromic dimmer of the second embodiment of the present invention.

As shown in FIG. 2, in the planar electrochromic dimmer of the present embodiment, as a modification of the upper electrode-equipped base 6 of the first embodiment, a transparent electrode film 2b is provided on the lower surface of the transparent base 1b, and the metal film 5 that regulates visible ray transmittivity is provided on the lower surface of the transparent electrode film 2b. The other parts have the same structure as those of the first embodiment.

Aside from being formed of Hastelloy X which is an alloy of Ni-Cr and other metals, the metal film 5 mentioned above can also be formed using a conductive ultraviolet ray reflecting film or a conductive infrared ray intercepting film, or a combination of both.

Since the metal film 5 reflects visible rays, ultraviolet rays, and infrared rays as well as operates as an electrode, the planar electrochromic dimmer of the present embodiment exhibits the same operation and effects of the first embodiment.

Third Embodiment

Still another embodiment of the present invention is described below with reference to FIG. 3.

Figure 3:
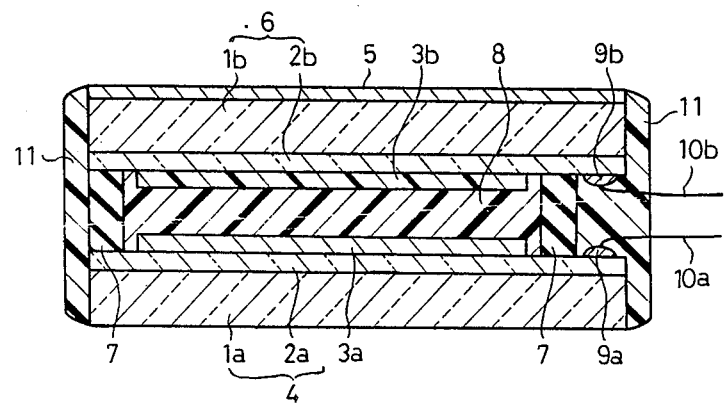
FIG. 3 is a sectional view showing the planar electrochromic dimmer of the third embodiment of the present invention.

As shown in FIG. 3, as a modification of the upper electrode-equipped base 6 of the first embodiment, a transparent electrode film 2b is provided on the lower surface of the transparent base 1b, then a reductive color-forming layer 3b is provided on the lower surface of the same transparent electrode film 2b. On the other hand, a metal film 5 is provided on the upper surface of the transparent base 1b, as a film to regulate visible ray transmittivity. The other parts have the same structure as those of the first embodiment.

Aside from Hastelloy X which is a Ni-Cr alloy, the metal film mentioned above can also be formed using an ultraviolet ray reflecting film or an infrared ray reflecting film, or a combination of both.

In the planar electrochromic dimmer of the present embodiment, since the metal film 5 is provided on the upper surface of the transparent base 1b, that is, on the outermost surface of the planar electrochromic dimmer, this metal film 5 reflects visible rays, ultraviolet rays, and infrared rays, thereby effectively preserving the entire planar electrochromic dimmer and preventing it from deteriorating. Aside from this, the present embodiment also exhibits the same operation and effects of the first embodiment.

The present invention is not limited to the embodiments described above; it can also be constructed as follows:

In the case of the first, second and third embodiments, color-forming layers 3a, 3b were provided on both the lower electrode-equipped base 4 and the upper electrode-equipped base 6. However, the color-forming film can be provided only on any one of the electrode-equipped bases 4, 6. For example, a reductive color-forming layer 3b of $WO_3$ can be provided on the lower surface of the metal film 5 of the upper electrode-equipped base 6.

As described in detail above, in the planar electrochromic dimmer of the present invention, in the discolored state, the visible ray transmittivity is effectively kept equal to or below 50%. Also, since it reflects visible rays, ultraviolet rays, and infrared rays, it exhibits good thermal insulating properties. Further, because of good conductivity of the electrode-equipped base, it has good coloring and discoloring response, is stable, and since a fixed reflecting film is provided, the durability is improved.

Inasmuch as it is clear that the present invention can be constructed and applied in a wide range of realization without departing from its spirit and scope, the embodiments of the present invention are not limited to specific embodiments except as defined in the appended claims.

What is claimed is:

1. A planar electrochromic dimmer comprising:
   first and second electrode-equipped bases, each including a transparent electrode film provided thereon, the bases being arranged such that the transparent electrode films face each other,
   an electrolyte provided between the electrode-equipped bases,
   a color-forming layer provided on at least one of said electrode-equipped bases, and
   a thin metal film with a visible ray transmittivity of 20-60% provided between said at least one color forming layer and its respective transparent electrode film, the metal film and the transparent electrode set functioning together as electrodes.

2. A planar electrochromic dimmer as set forth in claim 1, in which said thin metal film is a nickel (Ni) - chromium (Cr) alloy.

3. A planar electrochromic dimmer as set forth in claim 2, in which said nickel (Ni) - chromium (Cr) alloy is Hastelloy X.

4. A planar electrochromic dimmer as set forth in claim 3, in which said Hastelloy X is a film having a thickness of 40-120 Å.

5. A planar electrochromic dimmer as set forth in claim 1, in which said thin metal film is further an ultraviolet ray reflecting film.

6. A planar electrochromic dimmer as set forth in claim 1, in which said thin metal film is further an infrared ray reflecting film.

7. A planar electrochromic dimmer as set forth in claim 1, in which said thin metal film is a three-layer film of titanium oxide $(TiO_2)$/silver (Ag)/titanium oxide $(TiO_2)$.

* * * * *